US005923646A

United States Patent [19]
Mandhyan

[11] Patent Number: 5,923,646
[45] Date of Patent: Jul. 13, 1999

[54] METHOD FOR DESIGNING OR ROUTING A SELF-HEALING RING IN A COMMUNICATIONS NETWORK AND A SELF-HEALING RING ROUTED IN ACCORDANCE WITH THE METHOD

[75] Inventor: Indur B. Mandhyan, Croten On Hudson, N.Y.

[73] Assignee: Nynex Science & Technology, White Plains, N.Y.

[21] Appl. No.: 08/705,953

[22] Filed: Aug. 30, 1996

[51] Int. Cl.[6] .................................................. H04L 12/28
[52] U.S. Cl. ........................................... 370/254; 370/406
[58] Field of Search ........................... 370/254, 256–258, 370/400–406, 216, 224

[56] References Cited

U.S. PATENT DOCUMENTS

| 4,633,246 | 12/1986 | Jones et al. | 370/224 |
|---|---|---|---|
| 5,179,548 | 1/1993 | Sandesara | 370/406 |
| 5,442,623 | 8/1995 | Wu | 370/224 |
| 5,475,676 | 12/1995 | Takatori et al. | 370/224 |
| 5,515,367 | 5/1996 | Cox, Jr. et al. | 370/404 |
| 5,533,016 | 7/1996 | Cook et al. | 370/406 |
| 5,546,542 | 8/1996 | Cosares et al. | 370/258 |

OTHER PUBLICATIONS

Tsong–Ho Wu et al., "A Class of Self–Healing Ring architectures for SONET Network Applications", SONNET/SDH: A Sourcebook of Synchronous Networking, pp. 151–161 (Edited by Siller and Shafi) (IEEE Press 1996) (Reprinted from IEEE Trans. Communi., vol. 40, N o. 11, pp. 1746–1756 (Nov. 1992)).

Tsong–Ho Wu et al., "Feasibility Study of a High–Speed SONET Self–Healing Ring Architecture in Future Interoffice Networks", SONET/SDH: A Sourcebook of Synchronous Networking, pp. 151–161 (Edited by Siller and Shafi) (IEEE Press 1996) (Reprinted from IEEE Commi. Maga., vol. 28, No. 11, pp. 33–42, 51 (Nov. 1990)).

Izaz Haque, et al., "Self–Healing Rings in a Synchronous Environment", SONET/SDH: A Sourcebook of Synchronous Networking, pp. 151–161 (Edited by Siller and Shafi) (IEEE Press 1996).

Ondria J. Wasem, "An Algorithm for Designing Rings for Survivable Fiber Networks", IEEE Transactions on Reliability, vol. 40, No. 4, pp. 428–432 (Oct. 1991).

W. Cook et al., "An Algorithm for the Ring–Router Problem", Bellcore, Morristown, NJ (Nov. 1993, Mar. 1994).

*Primary Examiner*—Chi H. Pham
*Assistant Examiner*—Steven Nguyen
*Attorney, Agent, or Firm*—Michaelson & Wallace; Peter L. Michaelson; John C. Pokotylo

[57] ABSTRACT

A method for finding or routing a ring containing predetermined ring offices of a communications network while minimizing costs of communications channels used to route the ring. The ring may be a self-healing ring, the communications channels may be optical communications channels, the costs may be fiber transport costs and the network may be a SONET network.

21 Claims, 12 Drawing Sheets

| SONET Designation | CCITT Designation | Data Rate (Mbps) |
|---|---|---|
| STS-1/OC-1 | – | 51.84 |
| STS-3/OC-3 | STM-1 | 155.52 |
| STS-9/OC-9 | STM-3 | 466.56 |
| STS-12/OC-12 | STM-4 | 622.08 |
| STS-18/OC-18 | STM-6 | 933.12 |
| STS-24/OC-24 | STM-8 | 1,244.16 |
| STS-36/OC-36 | STM-12 | 1,866.24 |
| STS-48/OC-48 | STM-16 | 2,488.32 |
FIG. 1 (PRIOR ART)
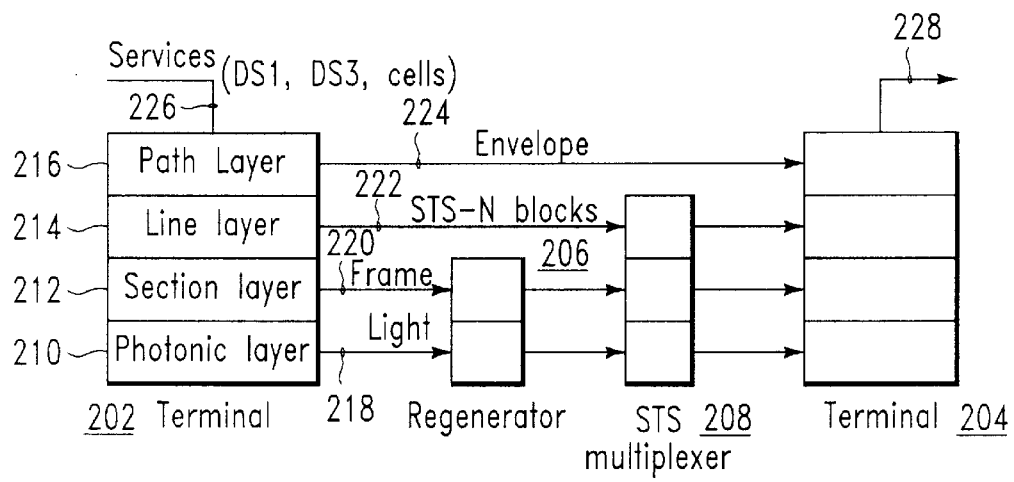
FIG. 2a (PRIOR ART)
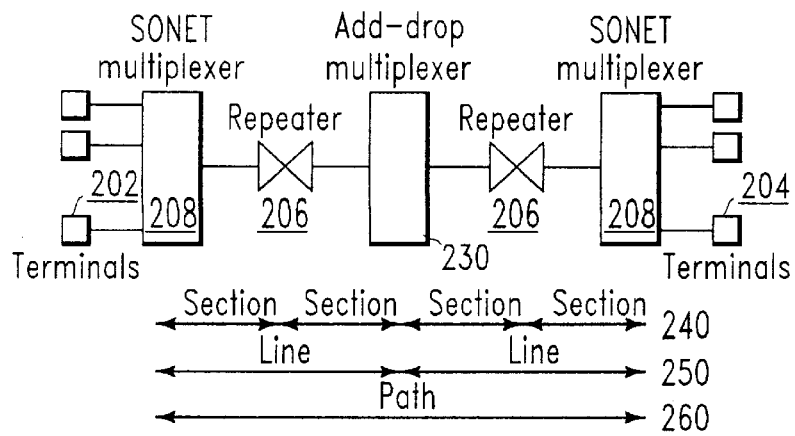
FIG. 2b (PRIOR ART)

VERTEX 1: (2, 2.8) (3, 2.4)

VERTEX 2: (1, 2.8) (3, 5.3) (4, 4.8)

VERTEX 3: (1, 2.4) (2, 5.3) (5, 5.6) (7, 6.9)

VERTEX 4: (2, 4.8) (7, 5.0)

VERTEX 5: (3, 5.6) (6, 4.1)

VERTEX 6: (5, 4.1) (7, 5.5)

VERTEX 7: (3, 6.9) (4, 5.0) (6, 5.5)

VERTEX 0:
(9,15.9899)  (8,86.8371)  (7,2.44732)  (6,74.4492)  (5,83.2926)
(4,43.4848)  (3,10.5432)  (1,24.3356)

VERTEX 1:
(9,40.8163)  (8,69.6691)  (7,31.6793)  (6,55.1348)  (5,37.9698)
(4,83.1053)  (3,19.343)   (2,49.5094)  (0,24.3356)

VERTEX 2:
(9,72.0349)  (8,55.7409)  (7,59.947)   (6,93.2977)  (5,21.4716)
(4,6.01317)  (3,59.4593)  (1,49.5904)

VERTEX 3:
(9,14.331)   (8,99.9972)  (7,51.2076)  (6,28.1839)  (5,76.8859)
(4,76.8655)  (2,59.4593)  (1,19.343)   (0,10.5432)

VERTEX 4:
(9,94.9434)  (8,83.8239)  (7,54.8626)  (6,6.44536)  (5,48.9218)
(3,76.8655)  (2,6.01317)  (1,83.1053)  (0,43.4848)

VERTEX 5:
(9,44.3677)  (8,6.41666)  (7,53.2249)  (6,45.4684)  (4,48.9218)
(3,76.8859)  (2,21.4716)  (1,37.9698)  (0,83.2926)

VERTEX 6:
(9,91.296)   (7,7.75273)  (5,45.4684)  (4,6.44536)  (3,28.1839)
(2,93.2977)  (1,55.1348)  (0,74.4492)

VERTEX 7:
(9,70.2426)  (8,46.5637)  (6,7.75273)  (5,53.2249)  (4,54.8626)
(3,51.2076)  (2,59.947)   (1,31.6793)  (0,2.44732)

VERTEX 8:
(9,97.1662)  (7,46.5637)  (5,6.41666)  (4,83.8239)  (3,99.9972)
(2,55.7409)  (1,69.6691)  (0,86.8371)

VERTEX 9:
(8,97.1662)  (7,70.2426)  (6,91.296)   (5,44.3677)  (4,94.9434)
(3,14.331)   (2,72.0349)  (1,40.8163)  (0,15.9899)

1→3   YES   19.34300

3→4   YES   27.18860

4→2   YES   6.01317

2→1   YES   49.5904

(b)

METHOD FOR DESIGNING OR ROUTING A SELF-HEALING RING IN A COMMUNICATIONS NETWORK AND A SELF-HEALING RING ROUTED IN ACCORDANCE WITH THE METHOD

BACKGROUND OF THE INVENTION a. Field of the Invention

The present invention concerns a method for designing a robust, highly reliable, and survivable communications network, and in particular, for designing or routing a self-healing ring in a network that complies with the SONET (or Synchronous Optical Network) protocol. The present invention also concerns a robust, highly reliable, and survivable communications network designed in accordance with the method.

b. Related Art

SONET is an optical transmission protocol intended to exploit the high-speed digital transmission capability of optical fiber. SONET was originally proposed by BellCore and standardized by the American National Standards Institute (or ANSI). Thus, SONET establishes an optical-signal standard for interconnecting equipment from different vendors. Although the SONET protocol is known to those skilled in the art, its salient features are briefly described below for the reader's convenience.

SONET provides a standard hierarchy of time division multiplexed digital transmission rates that accommodates existing North American and CCITT (Consultative Committee for International Telephone and Telegraph) transmission rates. As shown in the table of FIG. 1, this hierarchy uses 51.84 Mbps building blocks. In FIG. 1, the "OC", preceding a number "n", stands for the "Optical Carrier" level and the number "n" indicates a multiple of the 51.84 Mbps basic transmission rate. Also, in FIG. 1, the "STS" (or Synchronous Transport Signal) level corresponds to the OC level before the bit stream has been converted to an optical signal. Finally, as shown in FIG. 1, the CCITT rates start at STM-1 (Synchronous Transfer Mode-level 1) which corresponds to an OC-3 or 155.52 Mbps signal.

FIG. 2a is a block diagram of a connection of two (2) SONET terminals 202 and 204. As shown in FIG. (a), the SONET standard may be mapped into a four (4) layer logical hierarchy which includes (i) a photonic layer 210, (ii) a section layer 212, (iii) a line layer 214, and (iv) a path layer 216.

The photonic layer 210 is the physical layer. It specifies, for example, the type of optical fiber that may be used, the required minimum powers and dispersion characteristics of the transporting lasers, and the required sensitivity of the receivers. The photonic layer 210 is also responsible for converting STS (i.e., electrical) signals to OC (i.e., optical) signals.

The section layer 212 creates the basic SONET frames, which are described in greater detail below. It also specifies transmission functions such as framing, scrambling, and error monitoring. The line layer 214 is responsible for synchronizing and multiplexing data onto the SONET frames and for line protection switching. Finally, the path layer is responsible for end-to-end transport of data at the appropriate signaling speed.

FIG. 2b is a block diagram that shows a physical implementation corresponding to the four (4) logical layers discussed above. A section 240 represents a single run of optical cable between two (2) optical-fiber transmitter/receivers. For relatively short runs, the cable may run directly between two end units 202 and 204. However, for longer distances, repeaters 206 are needed. A repeater 206 regenerates and repeats a received stream of digital data.

A line 250 is a sequence of one or more sections 240. Within a line 250, the internal signal or channel structure of the signal remains constant. End points 208 and switches/multiplexers 230 may add or drop channels. An "add/drop network" includes add/drop multiplexers that permit standard DSn or SONET signals to be added to, or dropped from, a line signal. SONET add/drop nodes or multiplexers perform a function similar to traditional back-to-back multiplexers, except that through circuits are more economically cross-connected electronically (instead of being electrically patched together at a DSX panel and requiring interface circuit packs). Add/drop multiplexers are discussed in more detail below with reference to FIGS. 8 and 9.

Finally, a path 260 connects two end terminals 202, 204 and corresponds to an end-to-end circuit. Data are assembled at one end of a path 260 and are not or modified until they are disassembled at the other end of the path 260.

As discussed above with reference to FIG. 2a, the section layer 212 creates the basic SONET frames. As shown in FIG. 3, an STS-1 frame format 300 can logically be viewed as a matrix of nine (9) rows 302, each row having 90 octets 304. The STS-1 frame is transmitted one row at a time, from left to right and top to bottom. The 810 octets defining the STS-1 frame 300 are transmitted every 125 $\mu$s for an overall transmission rate of 51.84 Mbps.

As is further illustrated in FIG. 3, the first three columns 308 of the STS-1 frame 300 are reserved for transport overhead information. Specifically, the first three octets of the first three rows include section 240 overhead information 310, the first three octets of the fourth row include pointer data, and the first three octets of the fifth through ninth rows include line 250 overhead information 320.

More specifically, the first three octets of the first three rows 308 include "regenerator section overhead" information 310. This information may be used by SONET repeaters that renew the SONET signal. As shown in FIG. 4, octets 402 are framing bytes (F6, 28 hex) which are used to synchronize the beginning of the frame 300. Octet 404 is an STS-ID byte that identifies the STS-1 number for each STS-1 within an STS-N multiplex. Octet 406 is a bit-interleaved parity byte providing even parity over the previous STS-N frame after scrambling. The $i^{th}$ bit of this octet 406 contains the even parity value calculated from the $i^{th}$ bit position of all octets in the previous frame. Octet 408 is a section-level 64 Kbps PCM (pulse code modulation) orderwire that may be used to provide an optional voice channel between section terminating equipment, hubs and remote terminals. (An "orderwire" is a circuit used by a telephone company for establishing voice contact between a node and carrier repeater locations.) Octet 410 is an undefined 64 Kbps channel that may be used for user defined purposes. The three octets 412 define a 192 Kbps data communication channel for alarms, maintenance, control, and administration between sections 240.

The first three octets of the forth row 414 define pointers that indicate where, within the payload, the data starts. These pointers are needed because the SONET protocol permits data to start at an arbitrary byte in the payload. These pointers 414 permit frame alignment and frequency adjustment of the payload data. The pointers 414 may also point to one of the 90 columns 330 used for multiplexing information within the data (or "path overhead"). The path overhead 330 is described in detail below.

The first three octets of the fifth through ninth rows define "multiplexer section overhead" information 320. This information is used by SONET multiplexers that combine and extract individual data channels from within the SONET frames 300. Octet 416 is a bit-interleaved parity byte for line-level error monitoring. Octets 418 are allocated for signaling between line-level automatic-protection switching equipment. Line protection switching will be described in more detail below. Specifically, they use a bit-oriented protocol that provides error protection and management of the SONET optical link. Octets 420 provide a 576 Kbps data communication channel for alarms, maintenance, control, monitoring and administration at the line 250 level. The octets 422 are reserved for future use. Finally, octet 424 is a 64 Kbps PCM voice channel for line-level orderwire.

As shown in FIG. 4, the path overhead 330 is formed by a column of nine octets. Octet 426 is a 64 Kbps channel used to repetitively send a user programmable 64-octet fixed-length string so a receiving terminal can continuously verify the integrity of a path. Octet 428 is a bit interleaved parity byte at the path level, calculated over all bits of the previous synchronous payload envelope (or SPE). Octet 430 designates whether the STS signal is "equipped" or "unequipped." An equipped STS signal has a line connection and path data to send. This octet 430 can be used to indicate the specific STS payload mapping that may be needed in receiving terminal to interpret the payload. In an unequipped STS signal, a line connection is complete but there are no path data to send. Octet 432 is a status byte, sent from path-terminating equipment back to path-originating equipment, which conveys the status of the terminating equipment and path error performance. Octet 434 is a 64 Kbps user definable channel. Octet 436 is a multiframe indicator for payloads that may not be carried on a single STS frame. Octets 438 are reserved for future use.

To reiterate, the SONET protocol is intended to exploit the high-speed digital transmission capability of optical fiber. To economically use optical fiber within a communications network, the network is often organized as a hubbing structure based on a "single homing" concept. With single homing, the communications between an office within the hub and an office outside the hub, are routed through an associated home hub. Unfortunately, hubbing network architectures are inherently vulnerable in the event of fiber cuts or major hub failures. This vulnerability, together with the high traffic capacity of optical fiber, increases the need for robust, survivable network architectures.

Optical fiber networks using the SONET protocol often include add/drop multiplexers 800. As shown in FIG. 8, an add/drop multiplexer 800 includes a time-slot assignment fabric 802 which permits flexible reassignment of time slots. This flexible reassignment of time slots permits the add/drop multiplexer 800 to be provisionable (locally or remotely) to (i) add traffic from a tributary 810 to a communications channel 806, and/or 808', via a tributary card 804, (ii) drop traffic from a communications channel 806 or 808 to a tributary 810, via a tributary card 804, and (iii) pass through traffic from communications channel 806 to 806' and/or from communications channel 808 to 808'.

As shown in greater detail in FIG. 9, an exemplary add/drop multiplexer 800 includes a time-slot assignment fabric 802 and tributary cards 804. In the time-slot assignment fabric 802, an incoming OC-48 signal 806 or 808 is converted to an electrical STS-48 signal by converter 902b or 904b, respectively, and demultiplexed by demultiplexer 908a or 908b, respectively, to provide 16 STS-3 signals. Any of the 16 STS-3 signals to be dropped are demultiplexed by demultiplexer 910b or 910a and passed to a tributary card 804 where a selector 912b or 912a and interface card 914b or 914a passes a selected one of the signals (i.e., a non-faulty signal) to switch 916. Any of the 16 STS-3 signals to pass through are remultiplexed by multiplexers 910a and 910b and multiplexers 906a and 906b to construct part of outgoing STS-48 signals. The outgoing STS-48 signals are converted to OC-48 signals 808' and 806' by converter 902a or 904a. Signals to be added are provided to a tributary card 804, via a switch 916 where a generator (not shown) passes it to multiplexers 910a and 910b and multiplexers 906a and 906b to construct part of outgoing STS-48 signals. The STS-48 signals are converted to OC-48 signals 808' and 806' by converters 902a and 904a.

Recently, self-healing architectures are becoming increasingly used by network providers to meet user demands for network reliability and survivability. More particularly, the add/drop functionality encouraged by the SONET protocol has made the use of self-healing rings (or SHRs) popular. Although the use of self-healing rings in SONET networks is known (See e.g., the article, Haque et al., "Self-Healing Rings in a Synchronous Environment," *IEEE LTS*, (November 1991), modified and reprinted in *SONET SDH: A Sourcebook of Synchronous Networking*, pp. 131–139 (Edited by Siller and Shafi) (1996)), which is incorporated by reference herein), a brief discussion of self-healing rings in SONET networks is provided below for the reader's convenience.

In a self-healing ring network, traffic between two points is carried in an add/drop network that is looped back on itself to form a ring. Such a ring offers protection against fiber cuts or node failures by providing an alternative path which bypasses the cut fiber or failed node. In a ring add/drop architecture, there are no terminal nodes (or central office), and each node (or central office) has add/drop functionality.

Ring architectures may be classified based on (i) the directionality of service routing and (ii) the protection mechanism. Regarding the directionality of the service routing in the ring, a unidirectional ring carries service traffic in only one direction (i.e., only clockwise or only counterclockwise) of the ring. On the other hand, a bi-directional ring carries service traffic in both directions (i.e., clockwise and counterclockwise) on the ring. Regarding the protection mechanism of the ring, a path-switched ring protects traffic based on the health of each individual path where the path exits the ring, (see e.g. elements 216 and 224 of FIG. 2a and element 260 of FIG. 2b). On the other hand, a line-switched ring protects traffic based on the health of the line between each pair of nodes (see e.g., elements 214 and 222 of FIG. 2a and elements 250 of FIG. 2b) and when a line is faulty, the entire line is switched to a protection loop at the boundaries of the faulty line.

Based on the above two categories of directionalities of service routing and protection mechanisms, two ring architectures have become preferred for use in SONET networks; namely (i) two-fiber unidirectional path-switched rings and (ii) two-fiber and four-fiber bi-directional line-switched rings. Although each of these ring architectures is understood by those skilled in the art, each is briefly described below for the reader's convenience.

FIG. 5a is a block diagram which illustrates a two-fiber unidirectional path-switched ring in which a number of nodes (or central offices) 502, 504, 506, 508 and 510 are connected in a ring with a service fiber 512 and a protection fiber 514. As shown in FIG. 5a, the service fiber 512 routes traffic within the ring in a clockwise direction while the protection fiber 514 routes traffic within the ring in a counterclockwise direction. Thus, a transmission 516 from node (or central office) A 502 to node (or central office) C 506 is carried by the service fiber 512 to node C in a clockwise direction. The signal 516 is also fed to the protection fiber 514 which carries it to node C 506 in a counterclockwise direction. As shown in FIG. 5a, in normal operation, at node C, the signal 516' is taken (or "dropped") from the service fiber 512. (Recall the selectors 912a and 912b of FIG. 9.) Similarly, transmission 518 from node C 506 to node A 502 is carried by the service fiber 512 in a clockwise direction and by the protection fiber 514 in a counterclockwise direction. In normal operation, at node A, the signal 518' is taken ("dropped") from the service fiber 512.

Each path is individually switched based on signal health. For example, as shown in FIG. 5b, if the service fiber 512 between node B 504 and node C 508 is cut, then a transmission 516 from node A 502 to node C 506 cannot reach node C 506 via the service fiber 512. That is, the path between nodes A 502 and C 506 is faulty. Thus, at node C 506, the signal 516" is taken (or "dropped") from the protection fiber 514, not the service fiber 512 because the path from node A 502 to node C 506 is faulty. However, the cut in the service fiber 512 between node B 504 and node C 506 does not affect the health of the service fiber path 512 from node C 506 to node A 502. Thus, at node A 502, the transmission 518" from node C 506 to node A 502 is taken from the service fiber 512, not the protection fiber 514.

In the two-wire unidirectional path-switched ring, each signal entering the ring is carried all the way around the ring. Thus, the amount of traffic on the ring is the sum of all traffic entering the ring.

FIG. 6 is a block diagram which illustrates a four-wire bi-directional line-switched ring in which a number of nodes (or add/drop multiplexers) 502, 504, 506, 508, and 510 are coupled in a ring with a two service fibers 612 and two protection fibers 614. One of the service fibers 612a carries traffic in a clockwise direction while the other service fiber 612b carries traffic in a counterclockwise direction. Similarly, one of the protection wires 614a carries traffic in a clockwise direction while the other protection fiber 614b carries traffic in a counterclockwise direction.

The operation of the four wire bi-directional line-switched ring is described with reference to FIG. 6. To transmit a message from node A 602 to node C 606 for example, node A is provisioned as an "add" node, intermediate nodes B 604, or E 610 and D 608, are provisioned as "through" nodes, and node C 606 is provisioned as a "drop" node.

Receiver, transmitter or single fiber failures can be protected by normal span protection. For example, if a service fiber 612a and/or 612b is cut at point 616, span switches (at Node A 602 and at Node B 604) will move the service from the service fiber 612a and/or 612b to the protection fiber 614a and/or 614b and back to the service fiber 612a and/or 612b as shown by the phantom lines 618. With such span-switching, the service between the other nodes is unaffected.

In the case of a complete fiber cut or a node failure, a line switch (such as an automatic protection switching system or "APS", for example) is used to perform a ring loop back function. For example, if the service 612 and protection 614 fibers are cut at point 620, Node D 608 will loop the counterclockwise protection fiber 614b back to the clockwise protection fiber 614a and will loop the counterclockwise service fiber 612b back to the clockwise service fiber 612a as shown by phantom lines 622. Similarly, Node C 606 will loop the clockwise protection fiber 614a back to the counterclockwise protection fiber 614b and will loop the clockwise service fiber 612a back to the counterclockwise service fiber 612b as shown by phantom lines 624. In the event of a node failure, such as by Node C 606 for example, Nodes B 604 and D 608 would both perform a loop back.

FIG. 7 is a block diagram of a two-fiber bi-directional path-switched ring which includes nodes (or central offices) 702, 704, 706, 708, and 710 with two physical fibers 712 and 714. In this ring, the capacity of a first fiber 712 is logically divided into a service portion and a protection portion. Both the service portion and the protection portion of the first fiber 712 route traffic in a clockwise direction. Similarly, the capacity of a second fiber 714 is logically divided into a service portion and a protection portion. Here, both the service portion and protection portion of the second fiber 714 route traffic in a counterclockwise direction. This ring can survive in the event of receiver, transmitter, fiber or node failure by providing a ring line loop back function similar to that described above with reference to FIG. 6. Specifically, if the clockwise fiber 712 and/or the counterclockwise fiber 714 was cut at point 720, Node D 708 would loop the counterclockwise fiber 714 back to the clockwise fiber 712 as shown by phantom line 722. Similarly, Node C 706 would loop the clockwise fiber 712 back to the counterclockwise fiber 714 as shown by phantom line 724. If a node, such as Node C 706 were to fail, both Nodes B 704 and D 708 would perform a loop back. However, electronics failures cannot be protected against with a span switch, as was the case with the four-fiber, bi-directional, path-switched ring of FIG. 6.

In the design and implementation of each of the above discussed types of self-healing ring architectures, and in other self-healing ring architectures as well, the cost of implementing the ring, known as "fiber transport cost," is a significant factor. The fiber transport cost includes costs for terminating equipment (e.g., multiplexers), fiber material (e.g., the optical fiber), and fiber placement (e.g., regenerators, licensing fees, etc.). When a ring is to be implemented in an existing network, certain nodes are specified as ring offices. Minimizing the cost to implement (or "route") a ring including the ring offices is a complex problem.

Methods for minimizing the costs for implementing a survivable fiber network, such as a self-healing ring network are known. For example, the article, Wasem, "An Algorithm for Designing Rings for Survivable Fiber Networks," *IEEE Transactions on Reliability*, Vol. 40, No. 4, pp. 428–432 (October 1991) (hereinafter referred to as "the Wasem article") discusses a method for routing fiber around a ring in a network. Given a network in which certain nodes (or central offices) are to be part of a self-healing ring, the Wasem article first tries a crude or rudimentary method to find a ring including each of the "ring" offices. If the crude method fails, a "greedy" heuristic (which is more complex than the crude method) is tried. A "greedy" heuristic is one which seeks to provide optimal local solutions at each step of the heuristic but does not necessarily provide an optimal global solution.

In the crude method, a hub ring office and a ring office furthest from the hub ring office are first determined. Next, two iterations of the Dijkstra shortest path algorithm are performed to find the two shortest, link disjoint paths (i.e., communications channels or paths sharing no common links) between the hub ring office and the furthest ring office. A ring is routed if the paths are node disjoint (i.e., share no common node) and if the cycle (or ring) formed includes all of the ring offices. If a ring cannot be routed, the greedy heuristic is tried.

In the greedy heuristic discussed in the Wasem article, a depth-first search for paths between all pairs of ring offices, in which the paths contain only two ring offices, is performed until a path length threshold is exceeded or the number of hops (i.e., number of links) in paths exceeds a threshold. After the paths are determined, different combinations of node disjoint paths are used to try to construct a ring. Specifically, starting at an office, the shortest path out which terminates at a next office is tried and so on until either (a) a ring is formed or (b) no more node disjoint paths are available. If no more node disjoint paths are available, the method starts at a new office and tries different path combinations. If still no ring is formed, the distance threshold is increased until the path distance increases to the point that a signal regenerator is needed.

Although the method discussed in the Wasem article can be used to find rings, the rings it constructs are often not even close to an optimum ring which minimizes fiber transport costs. Moreover, the "greedy" heuristic espoused in the Wasem article has a relatively slow run time, particularly for "dense" networks. (The "density" of a network corresponds to the number of different links between central offices. For example, in the New York-New England area, the Eastern Massachusetts network is relatively dense while the Rhode Island network is relatively sparse.) Thus, a new method is needed to design or route optimum or near-optimum rings in a network. The new method should be relatively quick, particularly when rings are to be found in dense networks.

SUMMARY OF THE INVENTION

It is believed that the present invention provides a near optimal solution to finding a ring in a network and does so in a relatively quick manner, particularly where dense networks are concerned, by providing a method for routing a ring in a network having a plurality of nodes, at least two of the plurality of nodes being ring nodes which are part of the ring, and a plurality of communications paths interconnecting the plurality of nodes, each of the plurality of communications paths having an associated cost. The method includes steps of: (a) assigning a vertex corresponding to each of the nodes and assigning a ring vertex corresponding to each of the ring nodes; (b) assigning a link having an associated distance to each of the communications paths having an associated cost such that each of the link distances correspond to each of the communications paths costs; (c) forming a tree having tree nodes corresponding to the ring vertices and edges connecting the tree nodes wherein the edges are labeled by communications paths in the network and wherein the costs of the communications paths between the ring offices corresponding to the tree nodes are minimized; (d) forming a directed tree from the tree by choosing an arbitrary leaf node of the tree as a root node; (e) traversing the directed tree, in a depth first manner, to determine whether a cycle between the tree nodes exists; and (f) if a cycle exists, routing a ring through nodes corresponding to the ring vertices corresponding to the tree nodes of the directed tree forming a cycle.

The step of forming a tree preferably includes sub-steps of: (i) selecting an initial tree node corresponding to an arbitrary ring vertex; (ii) selecting a tree node corresponding to a ring vertex having a shortest path, including only unused links and unused vertices, with the arbitrary ring vertex; (iii) selecting a tree node corresponding to a ring vertex having a shortest path, including only unused links and unused vertices, with any ring vertices corresponding to any selected tree nodes; and (iv) repeating step (iii) until no ring vertices are left.

In a preferred method of the present invention, if a cycle does not exist, it is determined whether any other leaf nodes exist. If other leaf nodes exist: (i) a new directed tree is formed by assigning an arbitrary one of the other leaf nodes as a root node; (ii) the new directed tree is traversed, in a depth first manner, to determine whether a cycle between the tree nodes exists; and (iii) if a cycle exists, a ring is routed through nodes corresponding to the ring vertices corresponding to the tree nodes of the new directed tree forming a cycle. If, on the other hand, other leaf nodes do not exist, it is determined whether other trees exist. If other trees are determined to exist: (i) a new tree is formed having new tree nodes corresponding to the ring vertices and edges; (ii) a directed new tree is formed from the new tree by choosing an arbitrary leaf node of the tree as a root node; (iii) the directed new tree is traversed, in a depth first manner, to determine whether a cycle between the new tree nodes exists; and (iv) if a cycle exists, a ring is routed through nodes corresponding to the ring vertices corresponding to the new tree nodes of the directed new tree forming a cycle.

The nodes may be add/drop multiplexers which may be located at central offices of a communications network.

The costs associated with the plurality of communications paths may include equipment costs (such as regenerators, etc.), optical fiber costs, leasing costs, line maintenance costs, and/or installation costs.

BRIEF DESCRIPTION OF THE DRAWINGS

FIG. 1 is a table showing the STS-n/OC-n signal hierarchy in the SONET protocol.

FIG. 2a shows the logical layers in the SONET protocol and FIG. 2b shows the physical layers in the SONET protocol.

FIGS. 13a and 13b illustrate trees formed and used by the method of the present invention. FIG. 13c illustrates a table of data generated by a depth first traversal of the tree of FIG. 13b.

FIG. 15 is a graph, used by the method of the present invention, including vertices corresponding to central offices, links corresponding to communications channels, and costs or distances corresponding to fiber transport costs in the network of FIG. 14.

FIG. 16*a* illustrates a tree formed and used by the present invention.

FIG. 16*b* illustrates a table of data generated by a depth first traversal of the tree of FIG. 16*a*.

DETAILED DESCRIPTION

Figure 3:
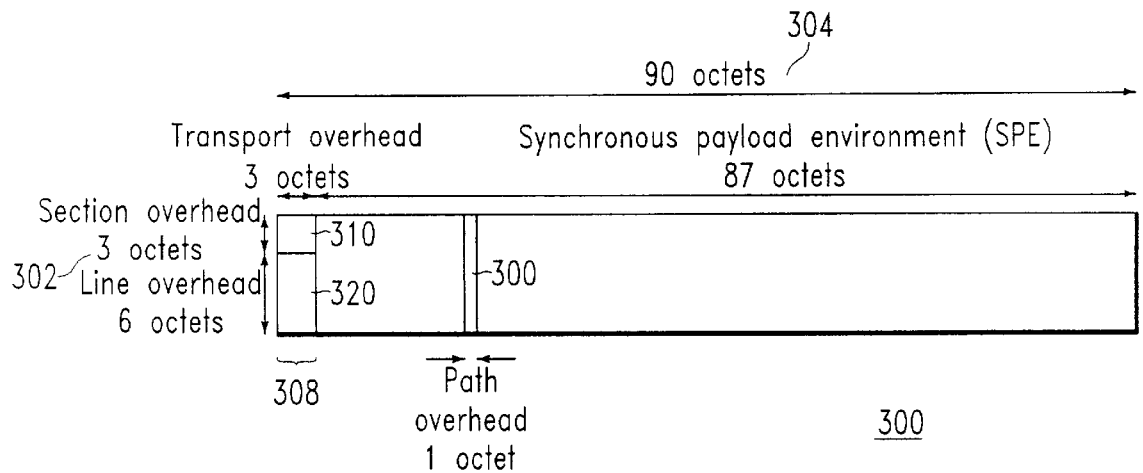
FIG. 3 illustrates the frame format in the SONET protocol.
Figure 4:
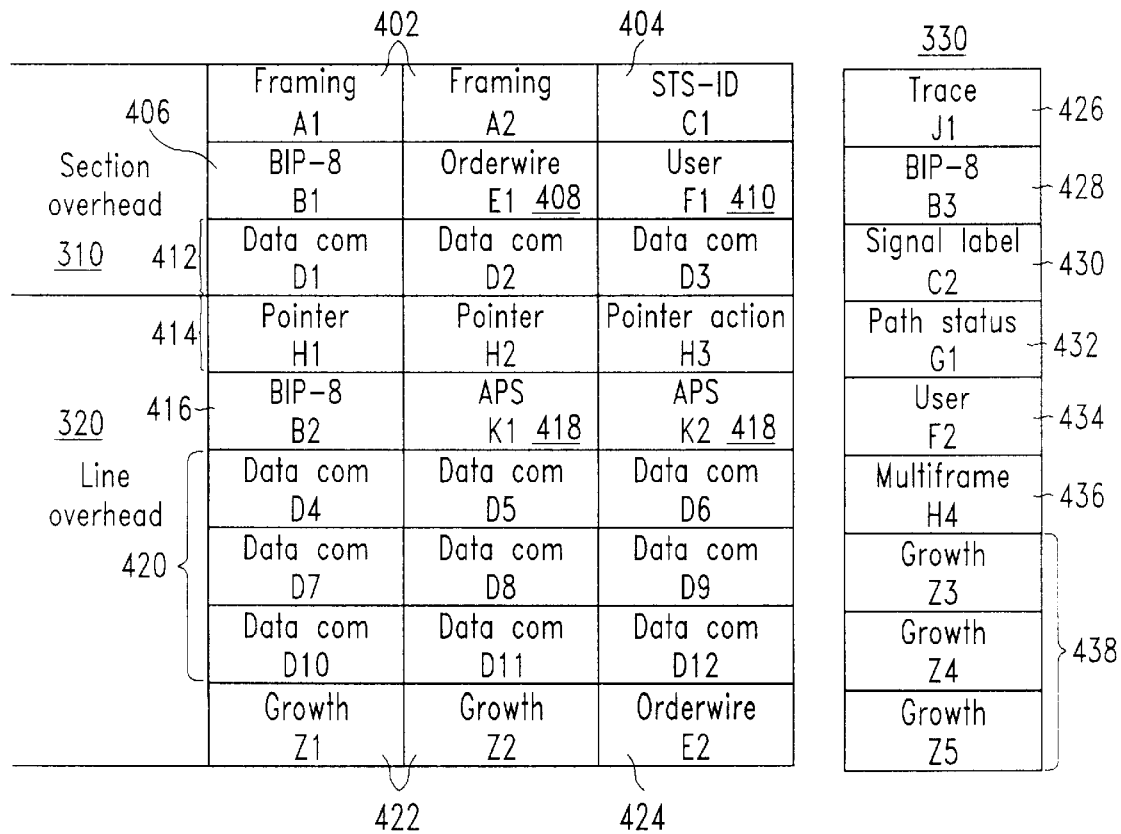
FIG. 4 illustrates the location of overhead information within the frame format of the SONET protocol.
Figure 5A:
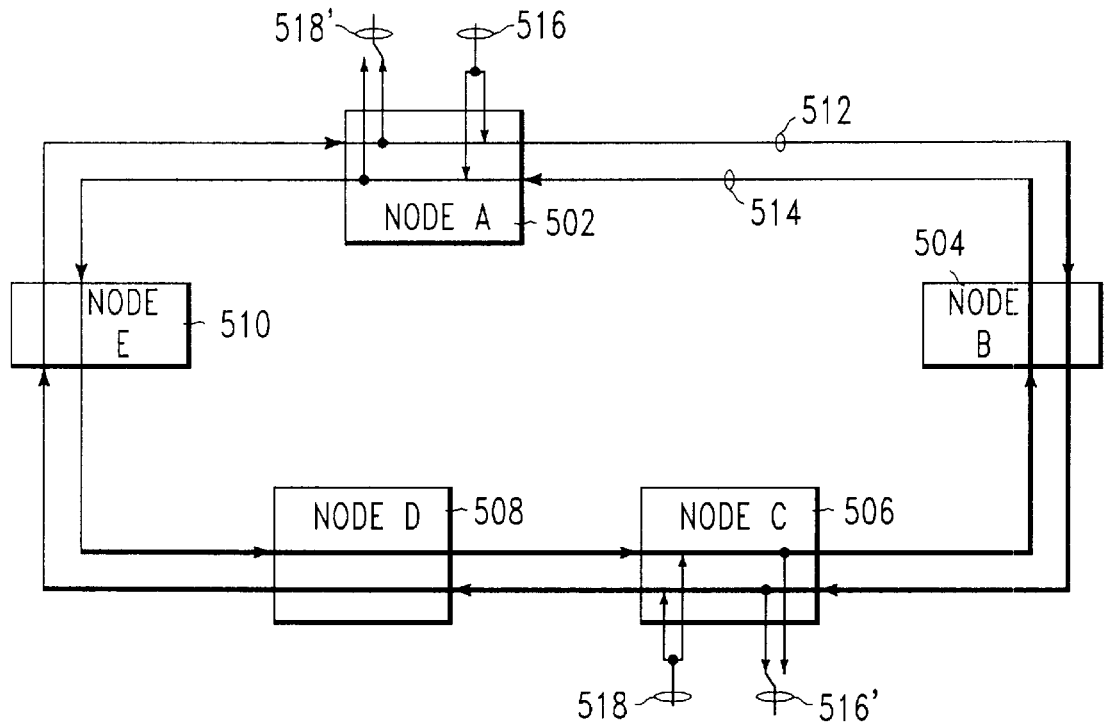
FIGS. 5a and 5b are block diagrams of a two fiber unidirectional path switched ring.
Figure 5B:
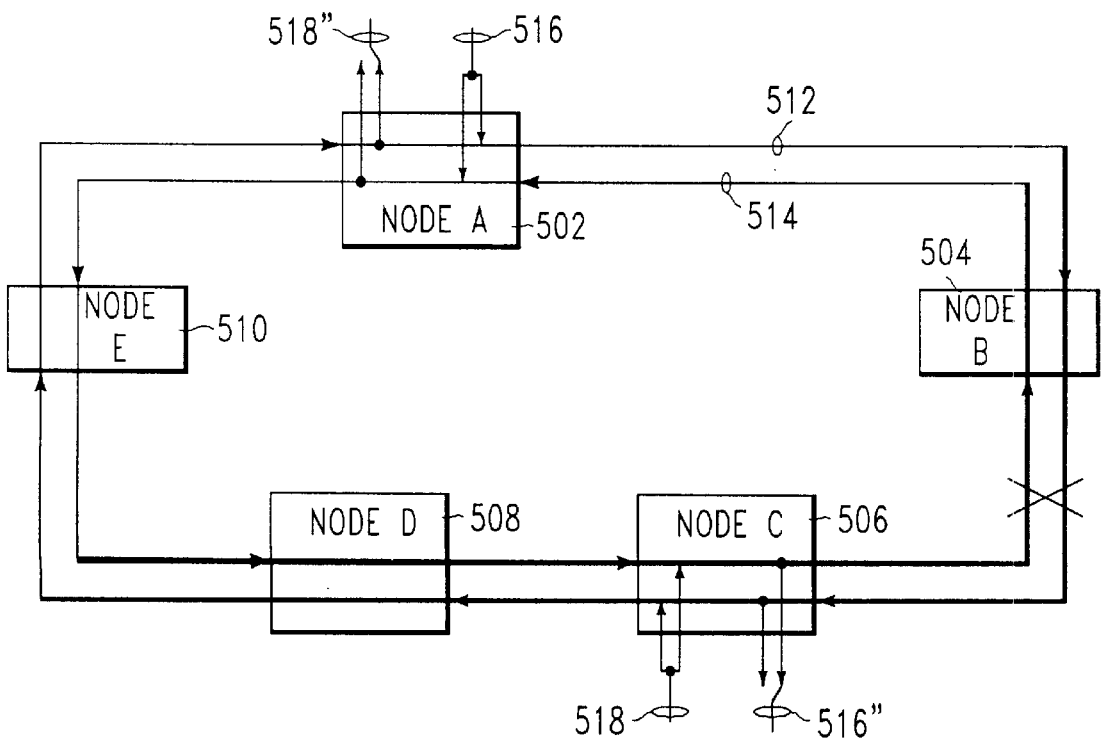
Figure 6:
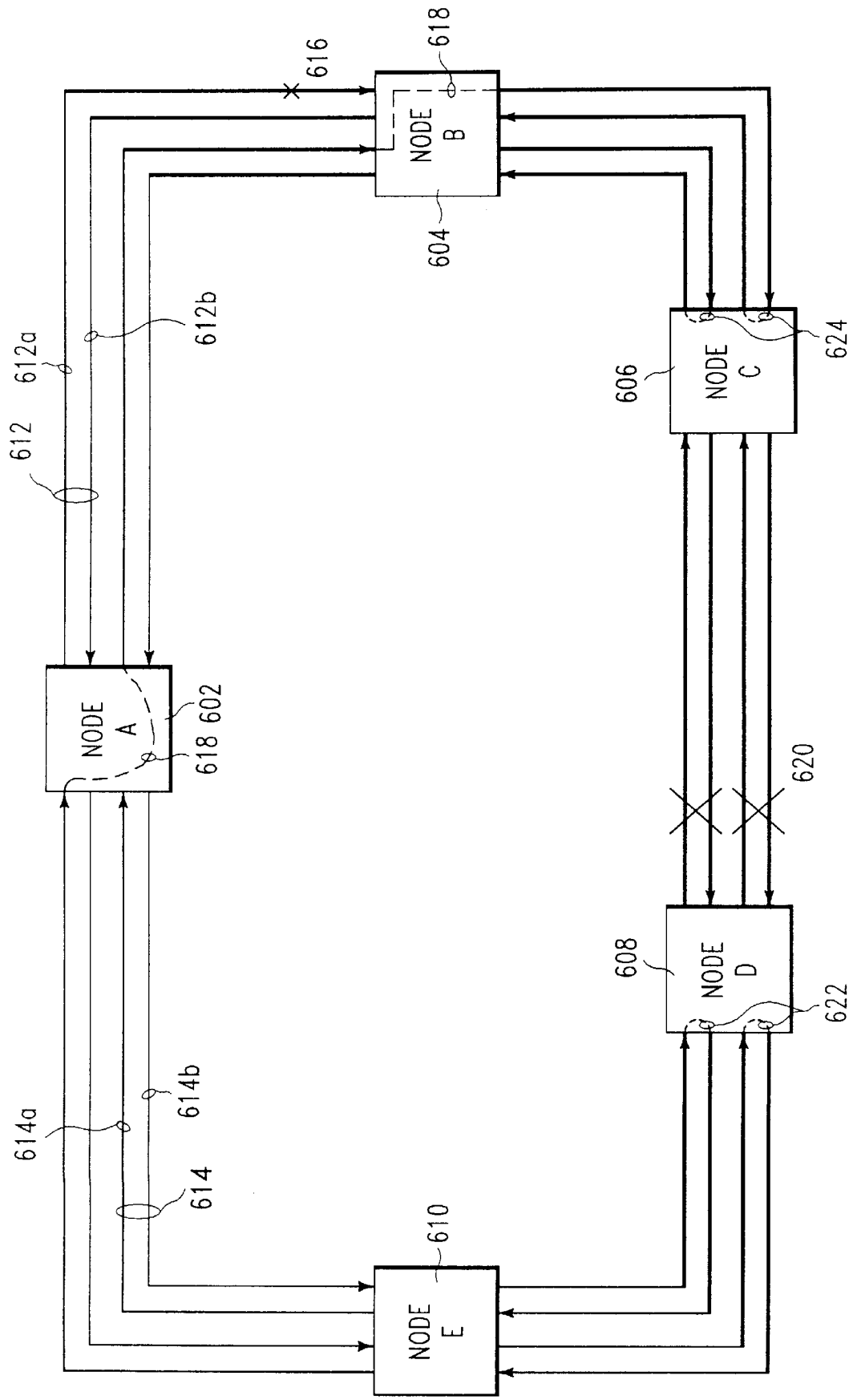
FIG. 6 is a block diagram of a four fiber bi-directional line switched ring.
Figure 7:
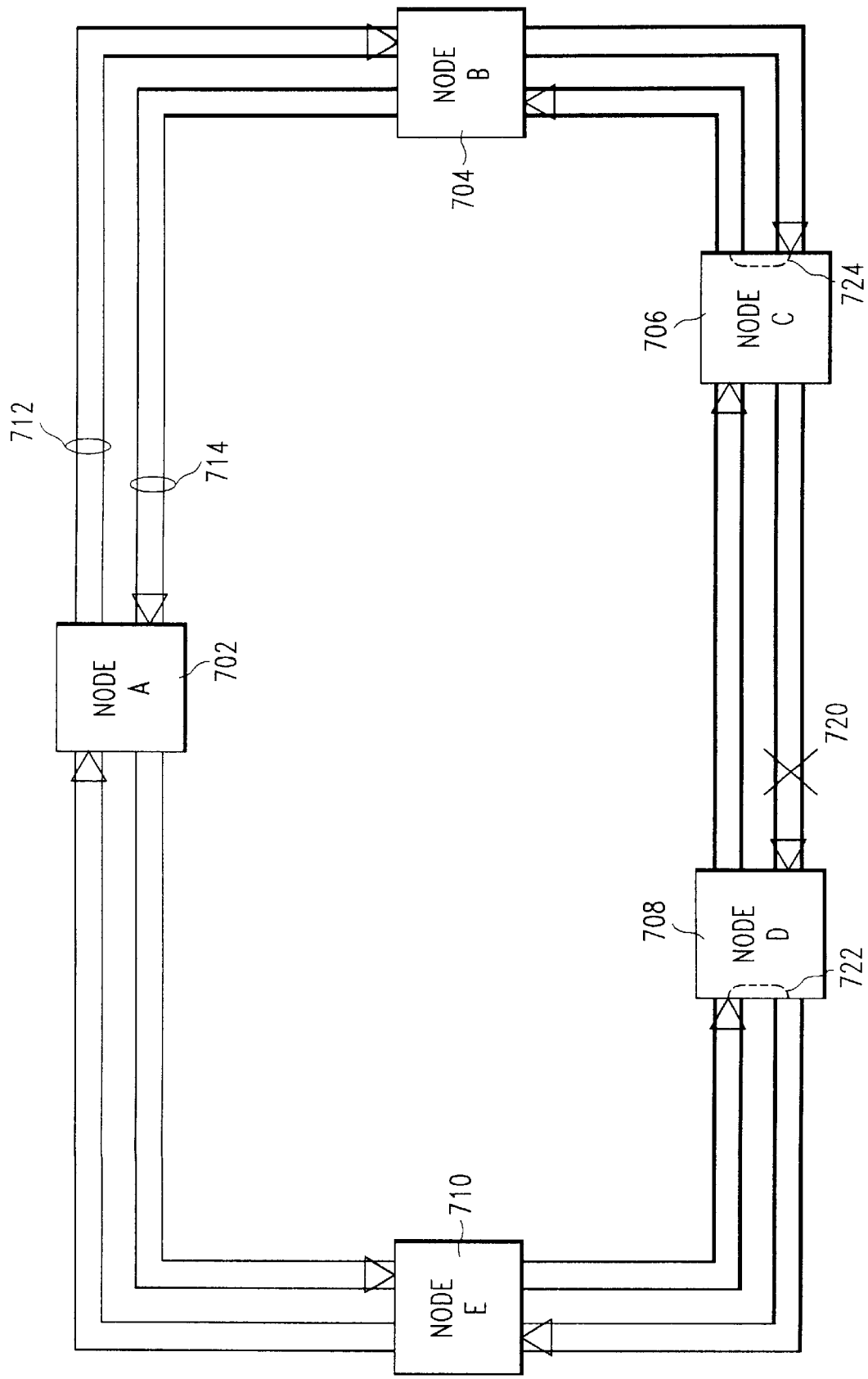
FIG. 7 is a block diagram of a two fiber bi-directional line switched ring.
Figure 8:
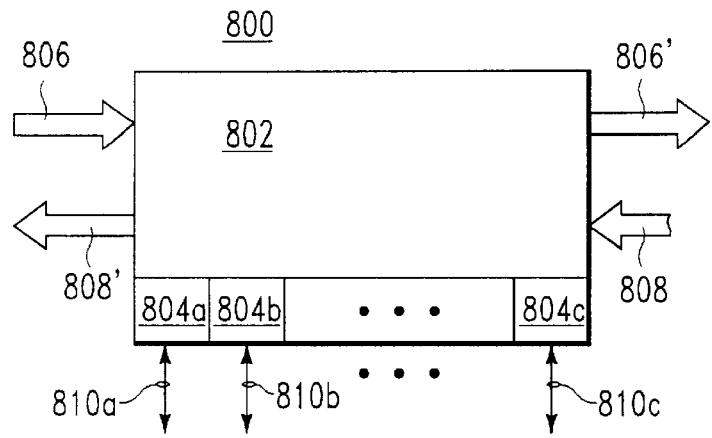
FIG. 8 is a block diagram of an add/drop multiplexer.
Figure 9:
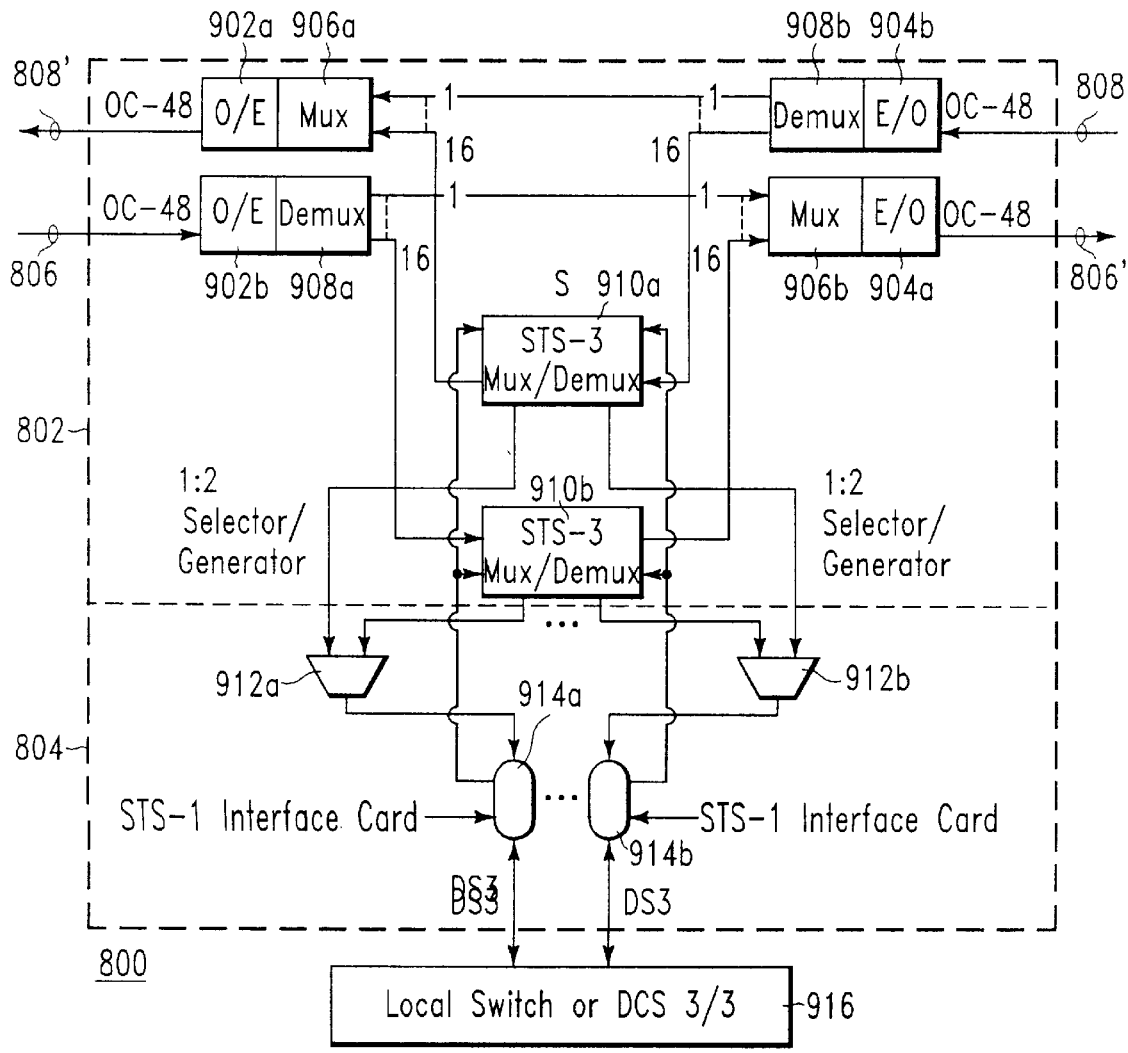
FIG. 9 is a more detailed block diagram of an add/drop multiplexer.

The present invention discloses a method for providing an optimal or near optimal solution to finding (or routing) a ring in a network. The method of the present invention will be described first with reference to FIG. 10 which is a flow diagram illustrating the method of the present invention. Next, the application of the method of the present invention to two hypothetical networks will be described with reference to FIGS. 11, 12, and 13*a*–13*c* and FIGS. 14, 15, 16*a* and 16*b*. In the following, networks are described as having "central offices", some of which are "ring offices", and "communications channels", each having an associated "fiber transport cost", linking the "central offices". Graphs are described as having "vertices" corresponding to the "central offices" of the network, "ring vertices" corresponding to the "ring offices" of the network, "links" corresponding to the "communications channels" of the network, "paths" corresponding to a sequence of one or more connected links, and "costs" or "distances" corresponding to the "fiber transport costs" of the "communications channels" of the network. Finally, trees are described as having "nodes" corresponding to the "ring vertices" of the graph and "edges" labeled by "paths" of the graph. However, at times, "central offices" and "vertices", "ring offices", "ring vertices", and "nodes", and "communications channels", "links", and "edges" are used interchangeably.

The method of the present invention first constructs a graph based upon network parameters. First, as shown in step 1002 of FIG. 10, the method of the present invention generates a graph having vertices corresponding to central offices of the network, links corresponding to communications channels between central offices of the network, and link costs (or "link distances") corresponding to costs of the communications channels linking various central offices. These costs may include fiber transport costs which include costs for terminating equipment (e.g., multiplexers), fiber material (e.g. optical fiber) and fiber placement (e.g., regenerators, licensing fees, etc.). Next, as shown in step 1004, certain of the vertices of the graph are selected as ring vertices. These ring vertices will correspond to central offices which require the increased survivability and reliability of a self-healing ring.

Basically, the method of the present invention next constructs a tree from the graph and determines whether any rings (or cycles) exist. If no cycles exist, a new tree is constructed and traversed. Specifically, as shown in step 1008, in the method of the present invention, tree nodes are defined by the ring vertices of the graph and tree edges are labeled by communications paths (each of which includes one or more links) of the network. Moreover, the method of the present invention determines the shortest paths between the ring vertices. Although the term "shortest path" connotes a distance, this term should be interpreted to mean link(s) coupling two vertices having the least cost. A standard shortest path algorithm may be used in this determination. In one embodiment of the present invention, the Bellman shortest path algorithm is used. The shortest (or least cost) path between two ring vertices may be direct or may pass through one or more non-ring vertices.

Next, as shown in step 1010, a tree is constructed. The tree may be constructed as follows. The tree is started by selecting an initial node corresponding to an arbitrary ring vertex, such as the lowest number ring vertex for example. Next, a node corresponding to a ring vertex having the least cost (or shortest) path (including a sequence of one or more connected links) with the ring vertex corresponding to the initial node is selected. The tree construction is continued by selecting successive, unused nodes (i.e., a node or vertex can only be used once) corresponding to ring vertices having the least cost (or shortest) path (including one or more connected links) with a ring vertex corresponding to any of the existing nodes of the tree.

Next, as shown in step 1012, the method of the present invention defines a directed tree by selecting an arbitrary leaf node, such as the leaf node having the lowest number, as a root node. As is known to those skilled in the art, a leaf node is a node having only one edge. Finally, as shown in step 1014, the directed tree is traversed, in a depth first manner, to determine whether a cycle (or ring) exists in the graph. Specifically, starting at the root node, the tree is traversed in depth-first order until a leaf node is encountered. Then, the next node (in depth-first order) is checked to determine whether a path of unused nodes exists between the ring vertices corresponding to the two nodes. If no such path exists, then a "backtrack occurs" and a depth-first traversal of the tree continues (i.e., a depth-first traversal of the tree occurs from the previous node along an alternative path) until another leaf node is encountered. Finally, when all tree nodes have been traversed, it is determined whether a path of unused nodes exists between the ring vertices corresponding to the last node of the tree and the root node of the tree. As shown in steps 1016, 1018, and 1020, if a cycle exists, a ring in the network has been found and the method ends.

Figures 16, 17:
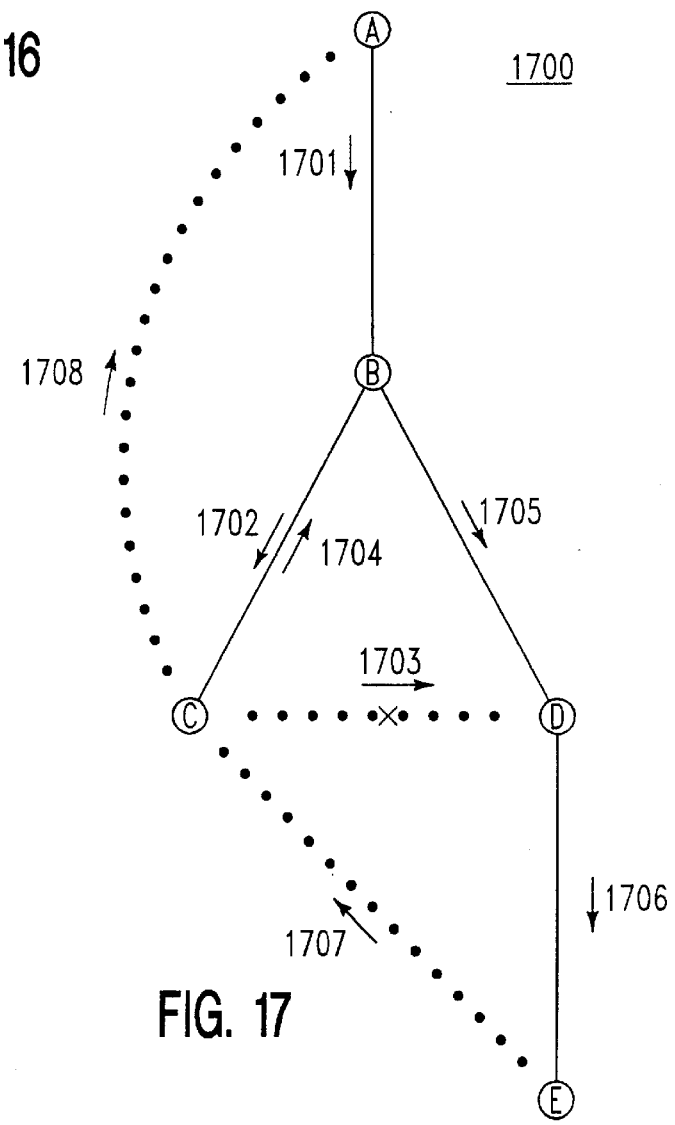
FIG. 17 is a tree which illustrates the exploratory nature, such as "backtracking", of the present invention.

FIG. 17 is a tree 1700, the traversal of which illustrates the exploratory nature of the method of the present invention. The directed tree 1700 includes nodes A, B, C, D and E and edges AB, BC, BD, and DE. The directed tree 1700 is traversed, in a depth-first manner, from node A to node B (step 1701) and from node B to node C (step 1702). Since node C is a leaf node, the next node in depth-first order (i.e., node D) is checked to determine whether a path of unused nodes exists between nodes C and D. (See step 1703). Since, in this example, no such path exists, the traversal of the tree 1700 is "backtracked" from node C to node B (step 1704). A depth-first traversal of the tree 1700 continues from node B along an alternative edge BD, until another leaf node (i.e., node E) is encountered. (See steps 1705 and 1706). Next, it is determined whether a path of unused nodes exists between leaf nodes E and C. In this example, such a path does exist. (See step 1707). Finally, since all of the tree nodes have been traversed, it is determined whether a path of unused nodes exists between leaf node C and root node A. In this example, such a path exists in the graph, and the graph includes a cycle constructed by appending the labels on edges AB, BD, DE, the path from E to C, and the path from C to A. (See step 1708).

If, on the other hand, a cycle does not exist, as shown in steps 1016 and 1022, whether the tree contains any more leaf nodes are determined. If the tree includes additional leaf nodes, a new directed tree is defined by selecting another arbitrary leaf node (such as the next lowest leaf node) as the root node and another depth first traversal of the tree is conducted to determine whether a cycle exists. (See steps 1022, 1024, 1014, and 1016.) If the tree does not contain any more leaf nodes, whether any more possible trees exist is determined. (See steps 1022 and 1026.) That is, it is determined whether a new tree can be generated by starting with a node corresponding to another ring vertex or whether a new tree can be generated by starting at the initial tree node and selecting sub-optimal paths to the other tree nodes. If more trees exist, a new tree is constructed, a directed tree is defined, and a depth first traversal of the directed tree is conducted to determine whether a cycle exists. (See steps 1026, 1028, 1012, 1014, and 1016.) If no more trees exist, no solution is found and the method ends. (See steps 1026, 1030 and 1020.)

Figure 10:
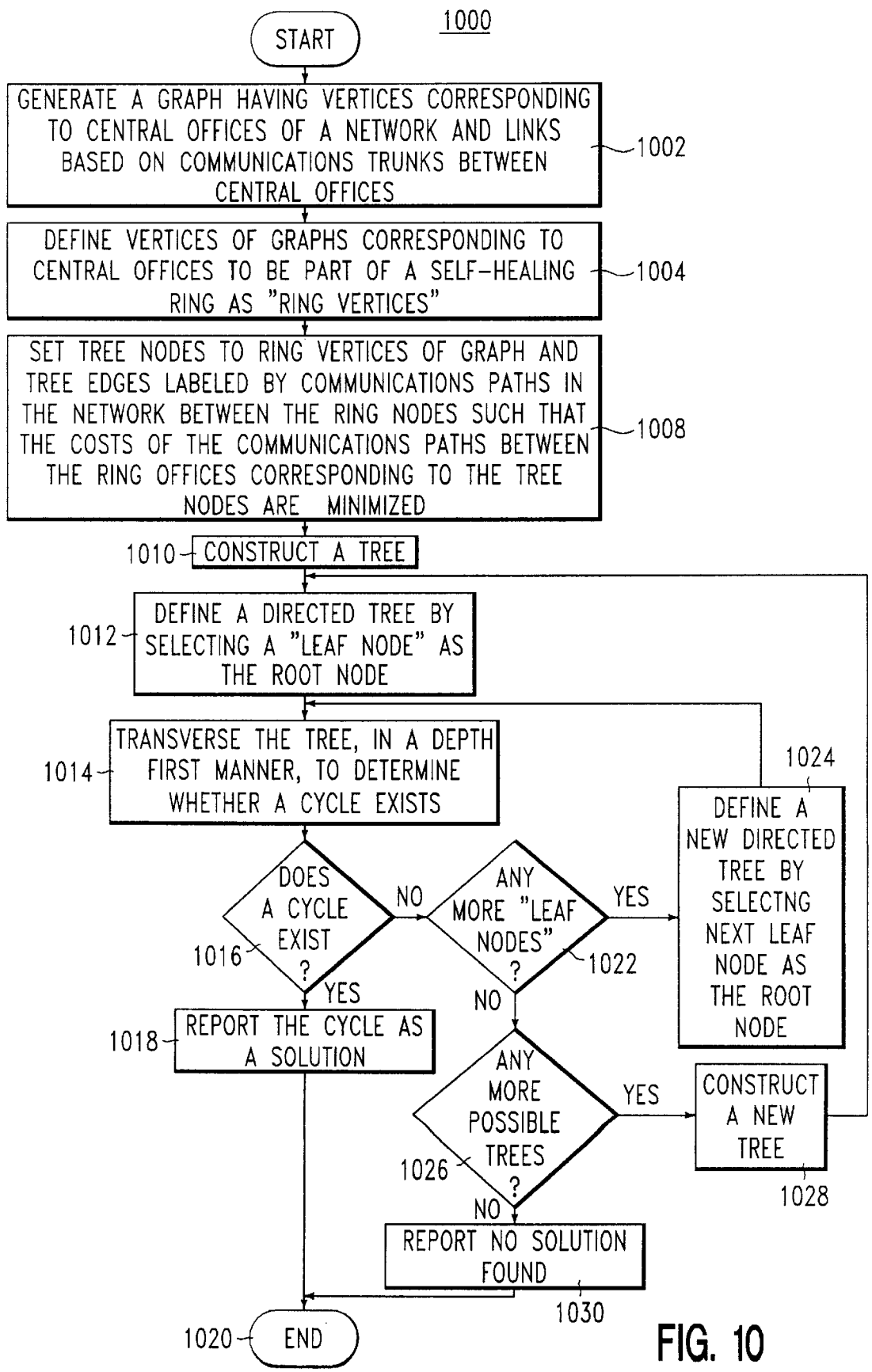
FIG. 10 is a flowchart which illustrates the method of the present invention.
Figure 11:
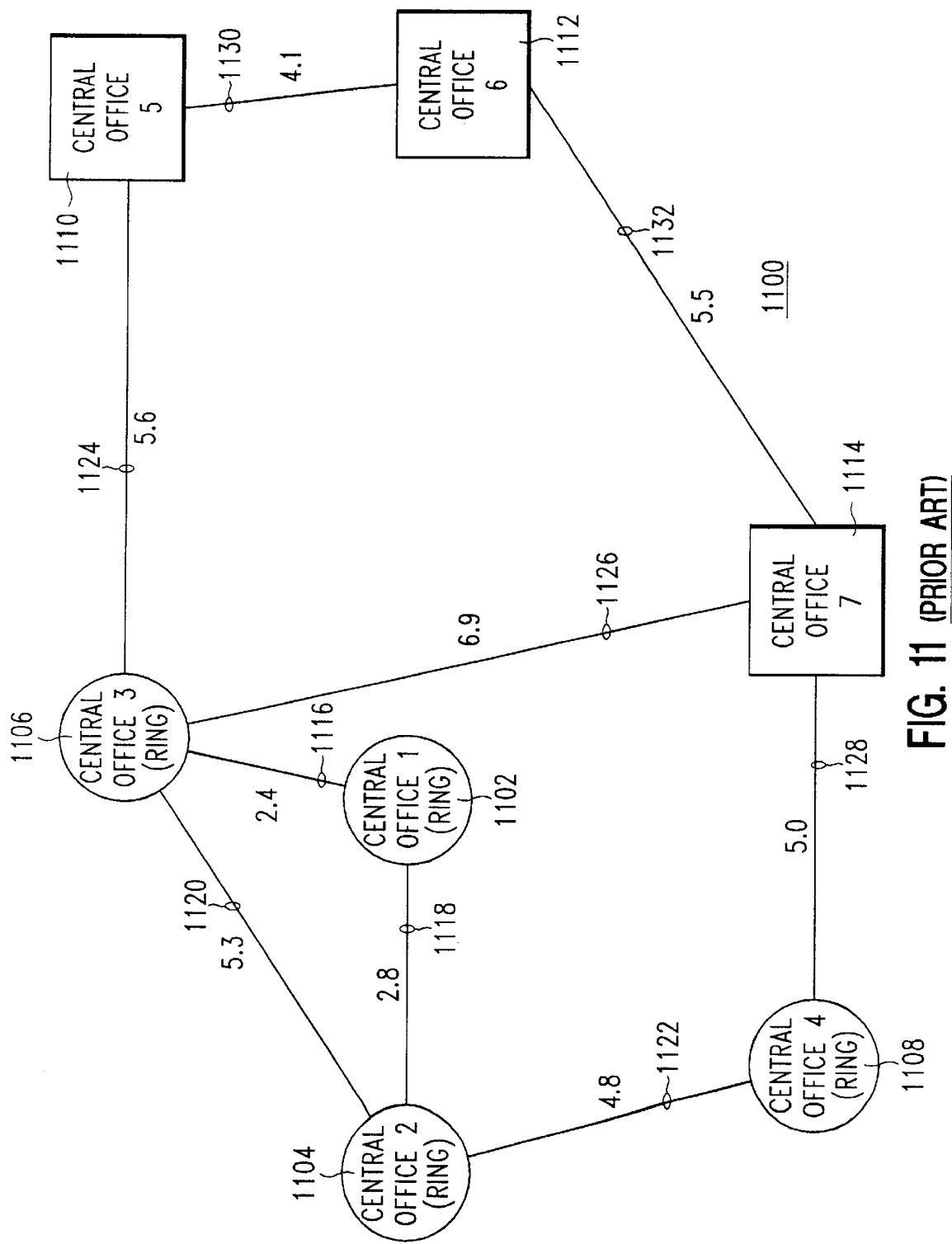
FIG. 11 is an example of a simple network in which the method of the present invention can form (or route) a ring.
Figures 12, 13:
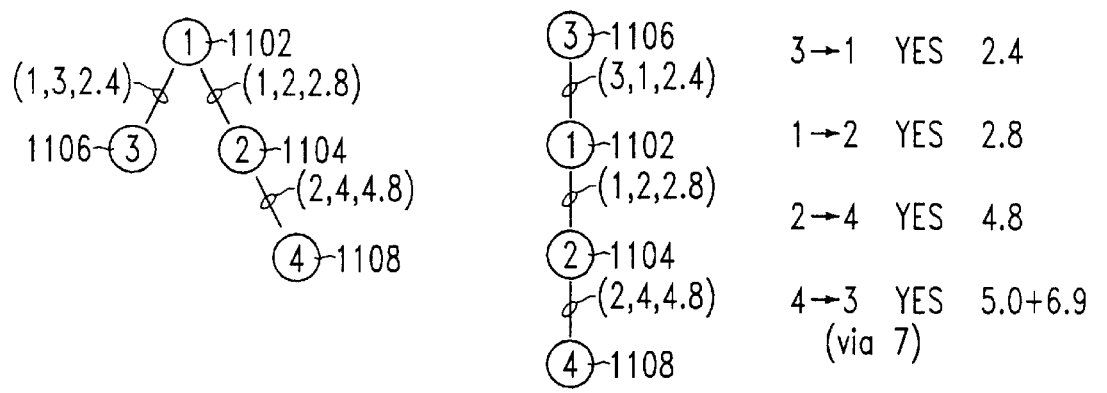
FIG. 12 is a graph, used by the method of the present invention, including vertices corresponding to central offices, links corresponding to communications channels, and costs or distances corresponding to fiber transport costs in the simple network of FIG. 11.

The method of the present invention, as applied to a first specific example, is described with respect to FIGS. 10, 11, 12, and 13a–13c. FIG. 11 illustrates a network to be analyzed by the method of the present invention. This exemplary network was taken from the FIG. 1 of the Wasem article. FIG. 12 is a graph which corresponds to the exemplary network of FIG. 11. FIG. 13a is a tree constructed from the graph of FIG. 12 in accordance with the method of the present invention. FIG. 13b is a directed tree based on the tree of FIG. 13a. FIG. 13c is a table of data generated from a depth first traversal of the directed tree of FIG. 13b.

FIG. 11 illustrates a network to be analyzed by the method of the present invention. The network 1100 includes central offices (or nodes) 1102, 1104, 1106, 1108, 1110, 1112, and 1114 and communications channels 1116, 1118, 1120, 1122, 1124, 1126, 1128, 1130, and 1132 between the central offices. In this example, it is assumed that each of the communications channels is a bi-directional channel. Central office 1 1102, central office 2 1104, central office 3 1106, and central office 4 1108 are chosen as ring offices. That is, it is determined that these central offices require the enhanced survivability and reliability of a self-healing ring. Ring offices are shown as circles while non-ring offices are shown as squares.

Central office 1 1102 may directly communicate with central office 2 1104 via communications channel 1118. The communication channel 1118 has a cost (e.g., a fiber transport cost) of 2.8. Central office 1 1102 may also directly communicate with central office 3 1106 via communications channel 1116. The communications channel 1116 has a cost of 2.4. This data is represented by the vertex, link, and cost (or distance) information in the first line of the graph of FIG. 12.

Since the communications channel 1118 is bi-directional in this example, central office 2 1104 may directly communicate with central office 1 1102 via the communications channel 1118. Central office 2 1104 may also directly communicate with central office 3 1106 via communications channel 1120, which has a cost of 5.3. Finally, central office 2 1104 may directly communicate with central office 4 1108 via communications channel 1122. The communications channel 1122 has a cost of 4.8. This data is represented by the vertex, link, and cost (or distance) information of the second line of the graph of FIG. 12.

Central office 3 may directly communicate with central offices 1 and 2 via communications channels 1116 and 1120, respectively. Again this is because the communications channels 1116 and 1120 are assumed to be bi-directional. Central office 3 1106 may also directly communicate with central office 5 1110 via communications channel 1124. The communications channel 1124 has a cost of 5.6. Finally, central office 3 1106 may directly communicate with central office 7 1114 via communications channel 1126. The communication channel 1126 has a cost of 6.9. This data is represented by the vertex, link, and cost (or distance) information of the third line of the graph of FIG. 12.

Central office 4 1108 may directly communicate with central office 2 1104 via communications path 1122. This is because the communications path 1122 is assumed to be bi-directional. Central office 4 1108 may also directly communicate with central office 7 1114 via communications path 1128. The communications path 1128 has a cost of 5. This data is represented by the vertex, link, and cost (or distance) information of the fourth line of the graph of FIG. 12.

Central office 5 1110 may directly communicate with central office 3 1106 via communications channel 1124. Again, this is because the communications channel 1124 is assumed to be bi-directional. Central office 5 1110 may also directly communicate with central office 6 1112 via communications channel 1130. The communications channel 1130 has a cost of 4.1. This data is represented by the vertex, link, and cost (or distance) information of the fifth line of the graph of FIG. 12.

Central office 6 1112 may directly communicate with central office 5 1110 via communications path 1130 because communications path 1130 is assumed to be bi-directional. Central office 6 may also directly communicate with central office 7 1114 via communications path 1132. The communications path 1132 has a cost of 5.5. This data is represented by the vertex, link, and cost (or distance) information of the sixth line of the graph of FIG. 12.

Finally, central office 7 1114 may directly communicate with central offices 3 1106, 4 1108 and 6 1112, via communications channels 1126, 1128 and 1132, respectively, because each of these communications channels is assumed to be bi-directional. This data is represented by the vertex, link, and cost (or distance) information of the seventh line of the graph of FIG. 12.

Again, central offices 1 through 4 are designated as ring offices. In accordance with the method of the present invention (See step 1010 of FIG. 10.), the tree illustrated in FIG. 13a may be constructed as follows. First, the lowest number ring vertex, in this example the ring vertex corresponding to central office 1 1102, is selected as an initial node of the tree. Next, the ring vertex corresponding to the central office having the lowest cost communications path to ring office 1 1102 is chosen as the next tree node. As shown in FIG. 12, central office 2 1104 has a communications path 1118 to central office 1 1102 having a cost of 2.8 and central office 3 1106 has a communications path 1116 to central office 1 having a cost of 2.4. Thus, as shown in FIG. 13(a), the vertex corresponding to central office 3 1106 is chosen as the next node of the tree. Next, the ring vertex corresponding to the unused central office having the least cost communications path to either central office 1 1102 or central office 3 1106 is chosen. As shown in FIG. 12, central office 2 1104 has a communications path 1118 with central office 1 1102 having a cost of 2.8 and a communications path 1120 with central office 3 1106 having a cost of 5.3. Thus, the vertex corresponding to central office 2 1104 is chosen as the next node of the tree and is linked with node 1 1102 as shown in FIG. 13(a). Finally, the ring vertex corresponding to the unused central office having the least cost communications path to either central office 1 1102, central office 2 1104, or central office 3 1106 is chosen as the next node of the tree. As shown in FIG. 12, central office 4 1108 has a communications path 1122 with central office 2 1104 having a cost of 4.8. The tree of FIG. 13(a) results.

Next, as shown in step 1012 of FIG. 10, a directed tree is defined by selecting an arbitrary leaf node, such as the lowest number leaf node, as a root node. To reiterate, a leaf node has only one edge. Thus, as shown in FIG. 13(a), both the node corresponding to the ring vertex corresponding to central office 3 1106 and the node corresponding to the ring vertex corresponding to central office 4 1108 are leaf nodes, while the nodes corresponding to the ring vertices corresponding to central office 1 1102 and central office 2 1104 are not. When the node corresponding to the ring vertex corresponding to central office 3 1106 is selected as a leaf node, the directed tree shown in FIG. 13(b) results.

Finally, as shown in step 1014, the directed tree of FIG. 13(b) is traversed in a depth first manner to determine whether a cycle exists. First, a link from the vertex 1106 corresponding to node 3 to the vertex 1102 corresponding to node 1 exists. Similarly, a separate (i.e., unused) path from the vertex 1102 corresponding to node 1 to the vertex 1104 corresponding to node 2 and another separate (or unused) path from the vertex 1104 corresponding to node 2 to the vertex 1108 corresponding to node 4 exist. Finally, to complete the cycle, a separate (or unused) path from the vertex 1108 corresponding to node 4 to the vertex 1106 corresponding to node 3 exists. The shortest path (or least cost communications channel) from central office 4 1108 to central office 3 1106 is via central office 7 1114. This information is shown in the table of FIG. 13(c). As shown, the total cost of the ring is 21.9 (=2.4+2.8+4.8+(5.0+6.9)).

Figure 14:
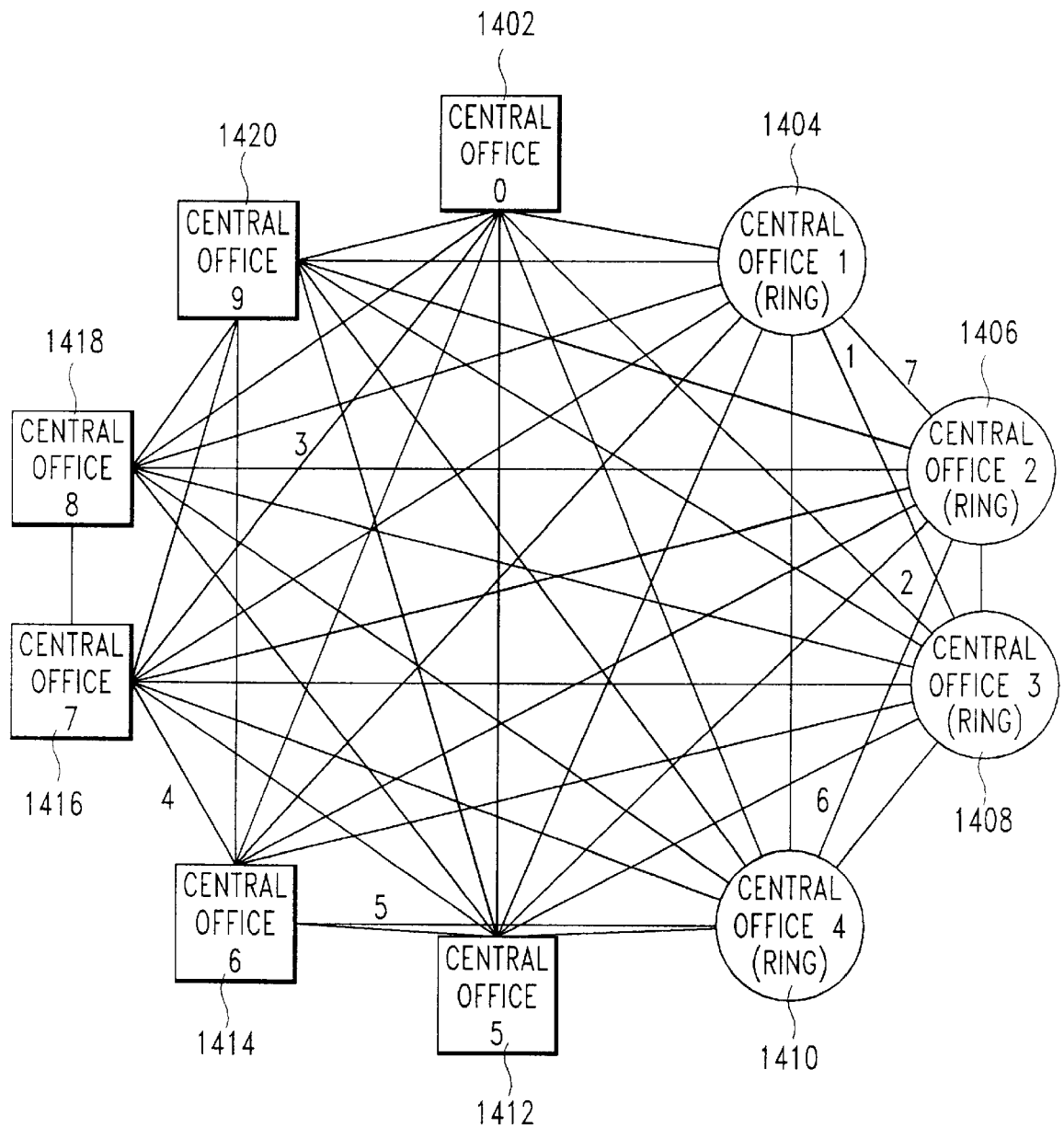
FIG. 14 is an example of another network in which the method of the present invention can form (or route) a ring.

FIG. 14 is a block diagram which illustrates a more dense network including central offices 0 1402, 1 1404, 2 1406, 3 1408, 4 1410, 5 1412, 6 1414, 7 1416, 8 1418, and 9 1420. The central offices are coupled with the communication paths shown. The costs of these communications paths are set forth in the graph of FIG. 15. Of the central offices, four (4) are designated as to be part of a self-healing ring; namely, central office 1 1404, central office 2 1406, central office 3 1408, and central office 4 1410. The ring offices are shown as circles while the non-ring offices are shown as squares. FIG. 15 is a graph having vertices corresponding to the central offices, links corresponding to the communications channels, and costs (or distances) corresponding to the costs (e.g., fiber transport costs) of the communications channels of the network of FIG. 14.

As shown in step 1010 of FIG. 10, a tree is constructed. A node corresponding to an arbitrary ring vertex, e.g., vertex 1, is chosen as the initial node of the tree. Next, a node corresponding to the ring vertex which corresponds to the ring office having the least cost communications path (direct or indirect) to ring office 1 1404 (which corresponds to the initial node) is chosen as the next node of the tree. As shown in the table of FIG. 15, the costs of the direct communications paths between ring office 1 1404 and ring offices 2 1406, 3 1408, and 4 1410, are 49.5904, 19.3430, and 83.1053, respectively. Thus, the vertex corresponding to ring office 3 1408 is chosen as the next node of the tree. Next, the vertex corresponding to the unused ring office having the least cost communications path with either ring office 1 1404 or ring office 3 1408 is chosen. As shown in the table of FIG. 15, the costs of the direct communications paths between ring office 3 and ring offices 2 1406 and 4 1410 are 59.4593 and 76.8655, respectively. As stated above, the costs of the direct communications paths between ring office 1 and ring offices 2 1406 and 4 1010 are 49.5904 and 83.1053, respectively. However, recall that the shortest (or least cost) communications path between ring offices determined by the shortest path (or least cost) algorithm may be an indirect path. That is, the shortest (or least cost) path may be via other central offices. In this case, an indirect path from ring office 3 1408 to ring office 4 1410 is available via central offices 0 1402, 7 1416, and 6 1414. As can be determined from the table of FIG. 15, the cost of this indirect communications channel is 27.1886 (=10.5432+2.44732+7.75273+6.44536). Thus, the next node of the tree selected is the vertex corresponding to ring office 4 1410. The only ring office left is ring office 2 1406. The least cost communications channel from ring office 4 1410 to ring office 2 1406 is the direct path which has a cost of 6.01317. The resulting tree is shown in FIG. 16(a). Although nodes corresponding to central offices 0 1402, 7 1416, and 6 1414 are shown, they are actually not a part of the tree.

Next, as shown in step 1012 of FIG. 10, an arbitrary leaf node, such as the leaf node corresponding to the ring vertex corresponding to central office 1 1404 for example, is chosen as the root node such that a directed tree is defined. In this example, the directed tree is exactly the same as the non-directed tree shown in FIG. 16(a).

Next, as shown in step 1014 of FIG. 10, the directed tree of FIG. 16(a) is traversed, in depth first manner, to determine whether a cycle (or ring) exists. Since there is a separate (i.e., unused) link (or communications channel) from central office 2 1406 back to central office 1 1404, a cycle exists. The cycle: (1) central office 1 1404 to central office 3 1406, (2) to central office 0 1402, (3) to central office 7 1416, (4) to central office 6 1414, (5) to central office 4 1410, (6) to central office 2 1406, and (7) back to central office 1 1404 is illustrated by the numbered links in FIG. 14.

In such relatively dense networks, the method of the present invention, when implemented as a processor executed program, is designed to execute faster and to provide more optimal solutions than known methods, such as the method discussed in the Wasem article for example. Moreover, since the SONET protocol limits the number of ring nodes to 16, the resulting tree size is limited. This method is extremely fast for such trees of limited size. Furthermore, the method of the present invention is fast for any size ring because it uses a depth-first traversal of the tree.

What is claimed is:

1. A method for routing a ring in a network having a plurality of nodes, at least two of the plurality of nodes being ring nodes which are part of the ring, and a plurality of communications channels interconnecting the plurality of nodes, each of the plurality of communications channels. having an associated cost, the method comprising steps of:

a) assigning a vertex corresponding to each of the nodes and assigning a ring vertex corresponding to each of the ring nodes;

b) assigning a link having an associated distance to each of the communications channels having an associated cost such that each of the link distances correspond to the cost of each of the communications channels;

c) forming a tree having tree nodes corresponding to the ring vertices and edges connecting the tree nodes wherein the edges are labeled by communications channels in the network and wherein the costs of the communications channels between the ring offices corresponding to the tree nodes are minimized;

d) forming a directed tree from the tree by choosing an arbitrary leaf node of the tree as a root node;

e) traversing the directed tree, in a depth first manner, to determine whether a cycle, in the graph, containing the tree nodes exists; and f) if a cycle in the graph exists, routing a ring through the ring nodes of the network, the ring being determined by the cycle in the graph.

2. The method of claim 1 further comprising steps of:

g) if a cycle does not exist, determining whether any other leaf nodes exist;

h) if other leaf nodes exist,
   i) forming a new directed tree by assigning an arbitrary one of the other leaf nodes as a root node;
   ii) traversing the new directed tree, in a depth first manner, to determine whether a cycle, in the graph, containing the tree nodes exists; and
   iii) if a cycle in the graph exists, routing a ring through the ring nodes of the network, the ring being determined by the cycle in the graph.

3. The method of claim 2 further comprising steps of:

h) if other leaf nodes do not exist,
   i) determining whether other trees exist, and if other trees are determined to exist:
      A) forming a new tree having new tree nodes corresponding to the ring vertices and edges;
      B) forming a directed new tree from the new tree by choosing an arbitrary leaf node of the tree as a root node;
      C) traversing the directed new tree, in a depth first manner, to determine whether a cycle, in the graph, containing the new tree nodes exists; and
      D) if a cycle in the graph exists, routing a ring through the ring nodes of the network, the ring being determined by the cycle in the graph.

4. The method of claim 1 wherein the nodes are central offices.

5. The method of claim 1 wherein the nodes are add/drop multiplexers.

6. The method of claim 1 wherein the costs associated with the plurality of communications channels include:

equipment costs; and optical fiber costs.

7. The method of claim 6 wherein the costs associated with the plurality of communications channels further include:

leasing costs.

8. The method of claim 6 wherein the costs associated with the plurality of communications channels further include:

line maintenance costs.

9. The method of claim 6 wherein the costs associated with the plurality of communications channels further include:

installation costs.

10. The method of claim 1 wherein the step of forming a tree includes sub-steps of:
   i) selecting an initial tree node corresponding to an arbitrary ring vertex;
   ii) selecting a tree node corresponding to a ring vertex having a shortest path, including only unused links and unused vertices, with the arbitrary ring vertex;
   iii) selecting a tree node corresponding to a ring vertex having a shortest path, including only unused links and unused vertices, with any ring vertices corresponding to any selected tree nodes; and
   iv) repeating sub-step (iii) until no ring vertices are left.

11. The method of claim 10 further comprising steps of:

v) if a cycle does not exist, determining whether any other leaf nodes exist;

vi) if other leaf nodes exist,
   A) forming a new directed tree by assigning an arbitrary one of the other leaf nodes as a root node;
   B) traversing the new directed tree, in a depth first manner, to determine whether a cycle, in the graph, containing the tree nodes exists; and
   C) if a cycle in the graph exists, routing a ring through the ring nodes of the network, the ring being determined by the cycle in the graph.

12. The method of claim 11 further comprising steps of:

vi) if other leaf nodes do not exist,
   A) determining whether other trees exist, and if other trees are determined to exist:
      1) forming a new tree having new tree nodes corresponding to the ring vertices and edges;
      2) forming a directed new tree from the new tree by choosing an arbitrary leaf node of the tree as a root node;
      3) traversing the directed new tree, in a depth first manner, to determine whether a cycle, in the graph, containing the new tree nodes exists; and
      4) if a cycle in the graph exists, routing a ring through the ring nodes of the network, the ring being determined by the cycle in the graph.

13. The method of claim 12 wherein the new tree is formed starting at the same root node and selecting sub-optimal paths between the tree nodes.

14. The method of claim 12 wherein the new tree is formed by selecting another leaf node as the root node.

15. The method of claim 10 wherein the nodes are central offices.

16. The method of claim 10 wherein the nodes are add/drop multiplexers.

17. The method of claim 10 wherein the costs associated with the plurality of communications channels include:

equipment costs; and optical fiber costs.

18. The method of claim 17 wherein the costs associated with the plurality of communications channels further include:

leasing costs.

19. The method of claim 17 wherein the costs associated with the plurality of communications channels further include:

line maintenance costs.

20. The method of claim 17 wherein the costs associated with the plurality of communications channels further include:

installation costs.

21. A self-healing ring including ring nodes in a network having a plurality of nodes, a plurality of communications channels interconnecting the plurality of nodes, each of the plurality of communications channels having an associated cost, wherein the ring nodes of the self-healing ring are selected by:

a) assigning a vertex corresponding to each of the nodes and assigning a ring vertex corresponding to each of the ring nodes;

b) assigning a link having an associated distance to each of the communications channels having an associated cost such that each of the link distances correspond to the cost each of the communications channels;

c) forming a tree having tree nodes corresponding to the ring vertices and edges connecting the tree nodes wherein the edges are labeled by communications channels in the network and wherein the costs of the communications channels between the ring offices corresponding to the tree nodes are minimized;

d) forming a directed tree from the tree by choosing an arbitrary leaf node of the tree as a root node;

e) traversing the directed tree, in a depth first manner, to determine whether a cycle, in the graph, containing the tree nodes exists; and f) if a cycle in the graph exists, routing a ring through the ring nodes of the network, the ring being determined by the cycle in the graph.

* * * * *